US012447098B1

(12) United States Patent
He et al.

(10) Patent No.: US 12,447,098 B1
(45) Date of Patent: Oct. 21, 2025

(54) MASSAGE DEVICE

(71) Applicants: Dongguan Meidi Sporting Goods Co., Ltd., Guangdong (CN); Shenzhen Linglang Technology Co., LTD., Guangdong (CN)

(72) Inventors: Qiuhui He, Guangdong (CN); Hongdu Suo, Guangdong (CN)

(73) Assignees: Dongguan Meidi Sporting Goods Co., Ltd., Guangdong (CN); Shenzhen Linglang Technology Co., LTD., Guangdong (CN)

( * ) Notice: Subject to any disclaimer, the term of this patent is extended or adjusted under 35 U.S.C. 154(b) by 0 days.

(21) Appl. No.: 19/018,712

(22) Filed: Jan. 13, 2025

(30) Foreign Application Priority Data

Jun. 27, 2024 (CN) ......................... 202421492653.1
Nov. 26, 2024 (CN) ......................... 202422900201.9

(51) Int. Cl.
*A61H 19/00* (2006.01)
*A61H 23/02* (2006.01)

(52) U.S. Cl.
CPC ............. *A61H 19/44* (2013.01); *A61H 23/02* (2013.01); *A61H 2201/0153* (2013.01); *A61H 2201/1654* (2013.01); *A61H 2201/1676* (2013.01)

(58) Field of Classification Search
CPC ........ A61H 19/44; A61H 19/50; A61H 21/00; A61H 19/00; A61H 23/00; A61H 23/02; A61H 2201/0153
See application file for complete search history.

(56) References Cited

U.S. PATENT DOCUMENTS 11,633,327 B1 * 4/2023 Wu .................... A61H 23/0263 601/70
11,771,619 B1 * 10/2023 Yan ........................ A61H 19/34 600/38
2014/0336452 A1 * 11/2014 Shahoian ............... A61H 19/32 600/38
2017/0105896 A1 * 4/2017 Derwin .................. A61H 19/34
2021/0393475 A1 * 12/2021 He ......................... A61H 19/34

* cited by examiner

*Primary Examiner* — Margaret M Luarca
*Assistant Examiner* — Sarah B Lederer
(74) *Attorney, Agent, or Firm* — ScienBiziP, P.C.

(57) ABSTRACT

The present disclosure provides a massage device including a main stimulation module, a second stimulation and a driving nuit, the main stimulation module and the sub-stimulation module are coupled to and driven by the driving unit. The main stimulation module performs telescoping movements relative to the housing to stimulate the vagina, while the sub-stimulation module swings back and forth by taking a fixing point to slide and rub against the inner wall of the vagina.

19 Claims, 6 Drawing Sheets

MASSAGE DEVICE

RELATED APPLICATIONS

This application claims the benefit of priority to Chinese Patent Application Number 202421492653.1 filed on Jun. 27, 2024, and Chinese Patent Application Number 202422900201.9 filed on Nov. 26, 2024, in the China National Intellectual Property Administration. The entire contents of the above-identified application are hereby incorporated by reference.

TECHNICAL FIELD

The present disclosure relates to a technical field of massage device, and in particular, to a massage device for females.

BACKGROUND

A massage device is primarily used to facilitate female sexual pleasure and typically is designed to resemble human genitals and may be vibrating or non-vibrating. These devices are approximately penis-shaped and can be made of plastic, silicone, rubber, vinyl, or latex. Dildo is the common name used to define a phallus-like sex toy, which does not provide any type of vibrations. But as vibrators have commonly the shape of a penis, there are many models and designs of vibrating dildos available including those designed for both individual usages, with a partner as well as for vaginal. However, the stimulation effects of the massage device may not meet the users' need.

BRIEF DESCRIPTION OF DRAWINGS

In order to illustrate the technical solution in embodiments of the present disclosure more clearly, the following briefly introduces accompanying drawings used in the description of the embodiments. Obviously, the accompanying drawings in the following description are only some embodiments of the present disclosure. Those of ordinary skill in the art can obtain other accompanying drawings from these accompanying drawings without any creative efforts.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Figure 1:
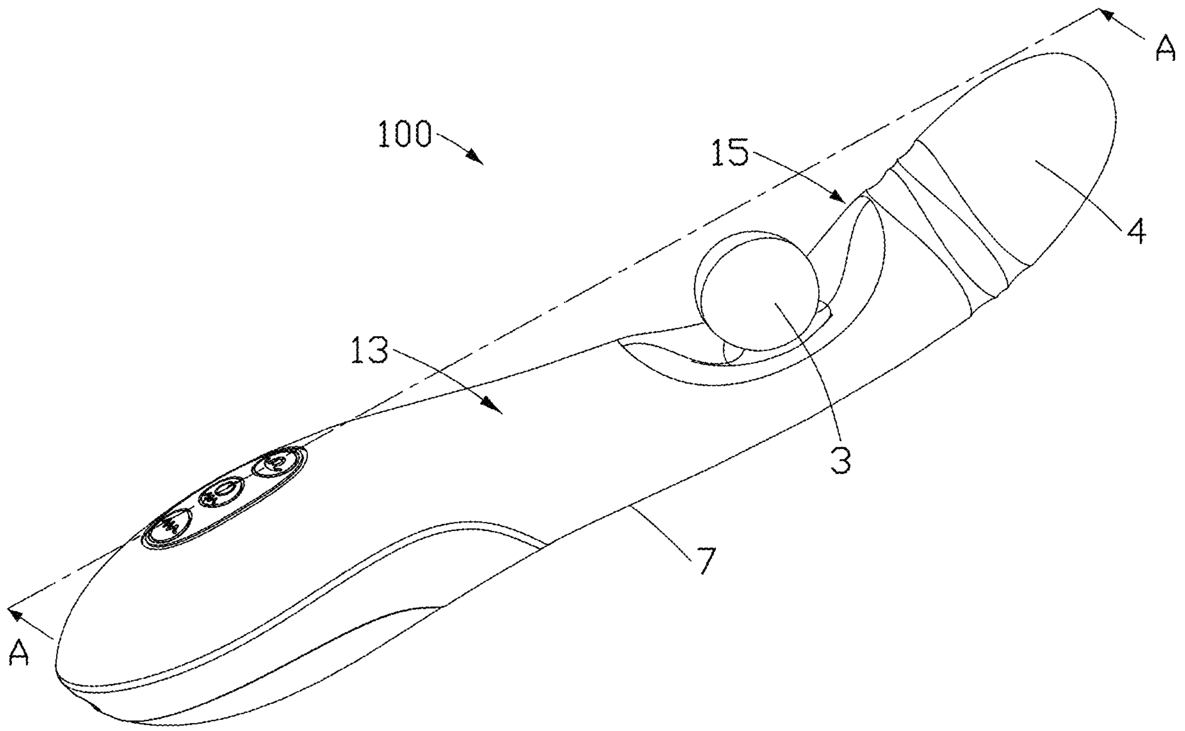
FIG. 1 is a perspective view of a massage device according to an embodiment of the present disclosure.

As shown in FIG. 1, the present disclosure provides a massage device 100. The massage device 100 is for example used in the field of sex products, which is capable of inserting into the woman's vagina and stimulating the vagina.

Figure 2:
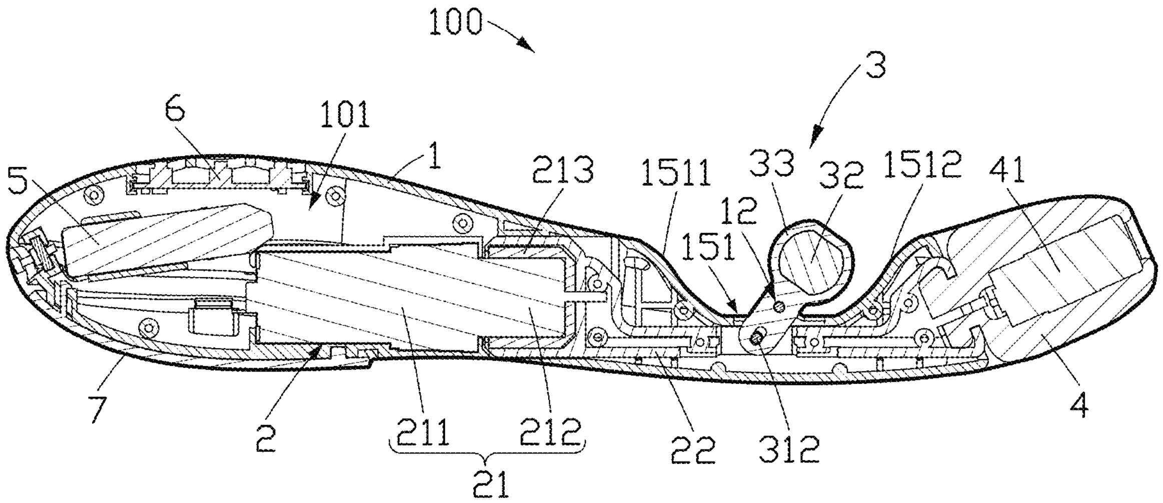
FIG. 2 is a cross-sectional view of the massage device shown in FIG. 1.

Referring also to FIG. 2, the massage device 100 comprises a housing 1, a driving unit 2, a main stimulation module 4, a sub-stimulation module 3, a battery 5 and a controller 6. An outer surface of the housing 1 contacts skin and transfers various simulations generated by the massage device 100 to the skin. The driving unit 2, the main stimulation module 4, the sub-stimulation module 3, the battery 5 and the source 6 are received in the housing 1. The driving unit 2 is electrically connected to the battery 5 and the controller 6, the main stimulation module 4 and the sub-stimulation module 3 are coupled to and driven by the driving unit 2. The main stimulation module 4 performs telescoping movements relative to the housing 1 to stimulate the vagina, the sub-stimulation module 3 swings back and forth by taking a fixing point so as to slide and rub against the inner wall of the vagina.

Figure 3:
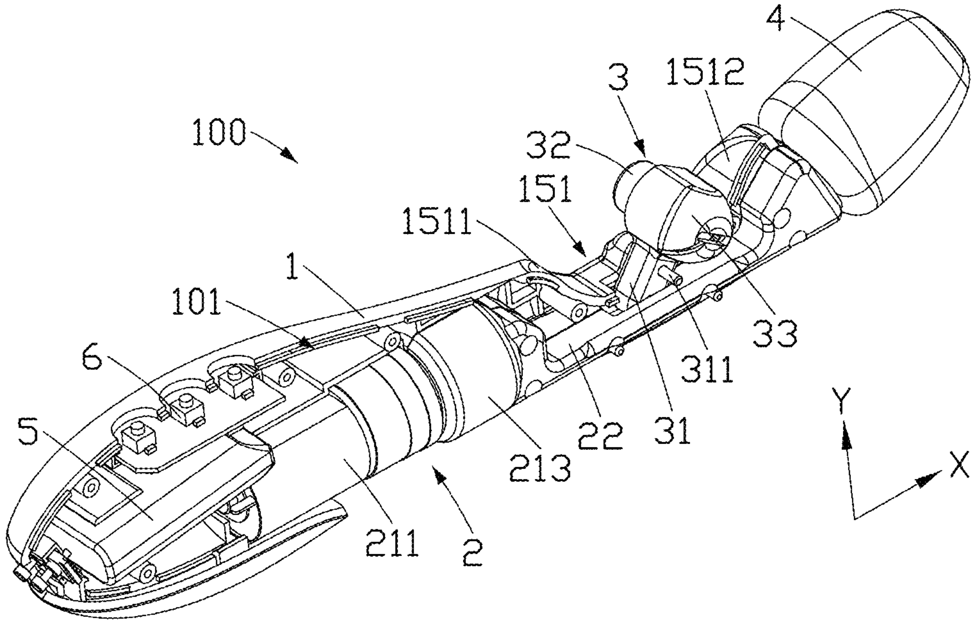
FIG. 3 is a perspective view of the massage device shown in FIG. 1, with a housing being partly removed.
Figure 4:
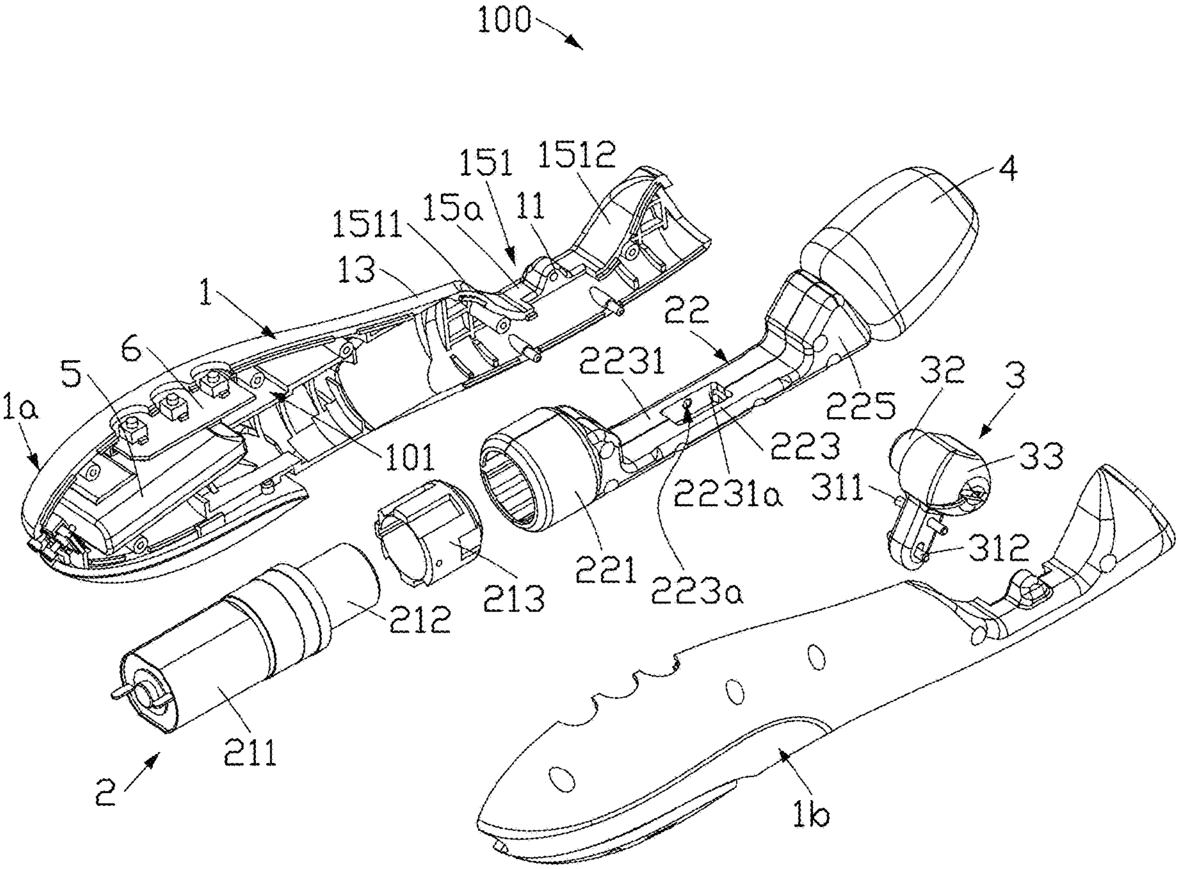
FIG. 4 is an exploded view of the massage device shown in FIG. 1.

Refer to FIG. 2 to FIG. 4, the housing 1 comprises a handle portion 13 and an insertion portion 15 configured for inserting into the vagina. The insertion portion 15 includes a mounting portion 15*a* extended and protruded from one end of the handle portion 13 along an insertion direction X that the insertion portion 15 is inserted into the human body. A receiving space 101 is defined by the handle portion 13 for receiving the driving unit 2. The mounting portion 15*a* has a concave shape structure, where a groove 151 is defined in the middle of the mounting portion 15*a*. The concave shape structure further comprising a first sidewall 1511 and a second sidewall 1512 arranged at two opposite sides of the groove 151, and a through hole 11 defined in the junction between the two sidewalls 1151 and 1152. The through hole 11 is in air communication with the receiving space 101 and acts as the fixing point around which the sub-stimulation module 3 swings. A fixing shaft 311 (as shown in FIG. 4) of the sub-stimulation module 3 is received in the through hole 11, so that the sub-stimulation module 3 is mounted onto the fixing shaft 311 and is capable of swinging around the fixing shaft 311. In some embodiment of the present disclosure, the housing 1 includes a left half shell 1*a* and a right half shell 1*b* detachably engaged with the left half shell 1*a*, a portion of the left half shell 1*a* corresponding to the concave shape structure is concaved inwardly along a direction Y perpendicular to the insertion direction X to form a half of the groove 151, and a portion of the right half shell 1*b* corresponding to the concave shape structure is concaved inwardly along the direction Y to form another half of the groove 151. In some other embodiments of the present disclosure, the housing 1 can be formed by an upper shell (not shown) and a lower shell (not shown) detachably engaged with the upper shell, the groove 151 can be for example formed in a portion of the upper shell concaved towards the lower shell.

The driving unit 2 is received in the housing 1, and comprises a driving member 21 and a transmission member 22 engaged with the driving member 21. The driving member 21 is received in the receiving space 101, and the transmission member 22 is accommodated in the mounting portion 15*a*.

The driving member 21 comprises a driving motor 211, a connecting base 212 and a connecting ring 213. The driving motor 211 is fixedly installed in the receiving space 101, one end of the driving motor 211 and the connecting ring 213 are both cylindrical structures, and the inner diameter of the connecting ring 213 is slightly larger than the outer diameter of the driving motor 211. One end of the connecting base 212 is engaged with the driving motor 211 so as to be driven by the driving motor 211, while another end of the connecting base 212 is fixedly connected to the transmission member 22 through the connecting ring 213. When the driving motor 211 rotates, and drives the connecting base 212 to move, and then the transmission member 22 is driven to move back and forth in the insertion direction X. In other words, the driving motor 211 starts to rotate in one direction, the connecting base 212 moves forwardly, and drives the connecting ring 213 to move, and then the transmission member 22 is driven to move forward by the connecting ring 213, and when the driving motor 211 start to move in another direction, the connecting base 212 moves backward, and drives the connecting ring 213 to move, and then the transmission member 22 is driven to move backward by the connecting ring 213. The driving motor 211 may be an electrical machine, which is capable of driving the transmission member 22 to reciprocate back and forth through driving force.

The transmission member 22 has a shape that matches with an internal space of the mounting portion 15*a*, and is movably installed in the mounting portion 15*a* of the housing 1. The transmission member 22 comprises a first fixing portion 221, two connecting arms 223, and a second fixing portion 225. The first fixing portion 221, which has a cylindrical shape, is interconnected with one end of the connecting ring 213. The transmission member 22 has a concave recess 2231 formed by inward depression at a portion of the transmission member 22 corresponding to the groove 151 of the housing 1. The concave recess 2231 defines an opening 2231*a*. The two connecting arms 223 are formed by two side walls of the concave recess 2231 which extend downwardly from two opposite sides of the opening 2231*a*. The concave recess 2231 cooperates with the groove 151 to form a receiving cavity for accommodating the second simulation module 3 and providing a swing space that the second simulation module 3 is required. Two connection holes 223*a* are formed at the connecting arms 223 respectively and are configured to couple with a second pivot shaft 312. The second fixing portion 225 is protruded upward from the ends of the connecting arms 223 away from the first fixing portion 221, so that the height of the second fixing portion 225 is taller than that of the first fixing portion 221 along the length direction of the housing 1.

In some exemplary embodiments of the present disclosure, the two connecting arms 223, each having a narrow portion, are formed by protruding from an end of the first fixing portion 221. The two connecting arms 223 are symmetrically arranged so that the narrow portions of the two connecting arms 223 are arranged face-to-face to form the concave recess 2231. The two connection holes 223*a* are formed at the narrow portions of the two connecting arms 223 respectively.

Figure 6:
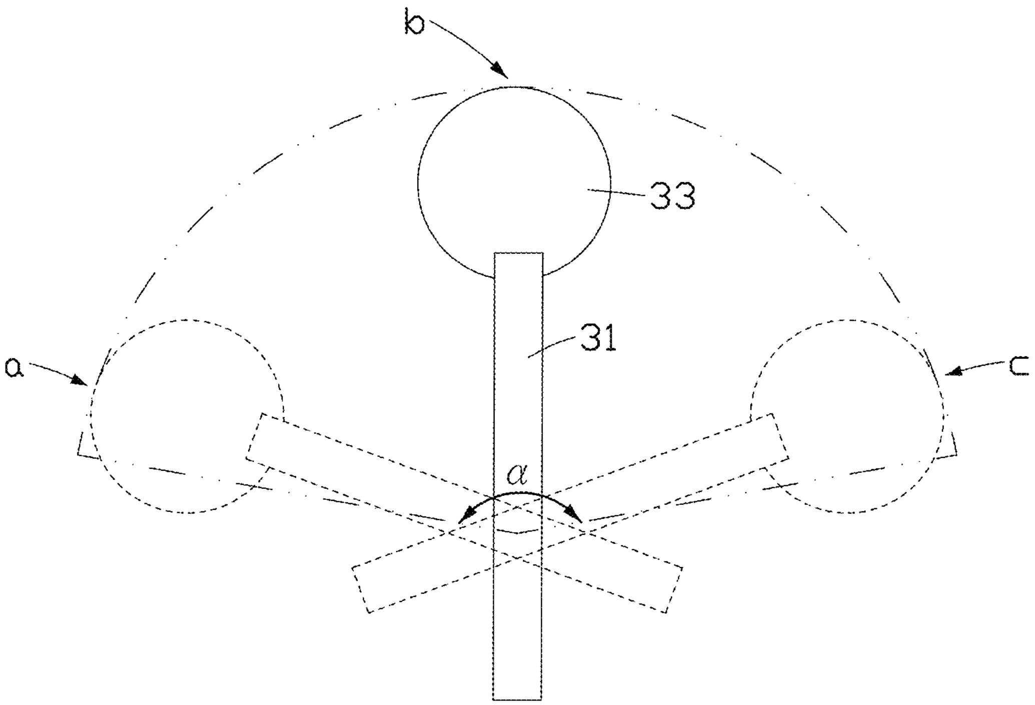
FIG. 6 is a state view of a three-swinging state of the head shown in FIG. 2.

The sub-stimulation module 3 is movably installed in the concave recess 2231, and comprises a rod 31 and a head 33 connected to the rod 31. Two shafts, including the pivot shaft 312 and the fixing shaft 311 are located on the rod 31. An end of the rod 31 rotatably moves around the pivot shaft 312 following with the movement of the transmission member 22, and simultaneously a maximum swing angle α of the rod 31 is limited or controlled by regulating the size of opening 2231*a* of the concave recess 2231. The rod 31 swings back and forth by taking the fixing shaft 311 as a fixing point and taking a length of the rod 31 as a fixed length, thereby forming an arc path C (as shown in FIG. 6). In this embodiment, the maximum swing angle α is 160°.

It is understood that the number of the head 33 can be at least two, and the swinging direction between adjacent heads 33 can be the same or different.

The rod 31 is a long strip shape, one end of the rod 31 is received in the concave recess 2231 and fixedly connected to the inner wall of the concave recess 2231 via a pivot shaft 312, thereby the rod 31 engages with the transmission member 22, and is capable of driving to move under the drive of the transmission member 22, another end of the rod 31 is extended out of the housing 1 through the through hole 11, and connected to the head 33. A fixing shaft 311 is installed in the sidewall of the rod 31 near the head 33. The fixing shaft 311 movably passes through the rod 31 and fixedly connected to the inner wall of the housing 1. Therefore, the rod 31 swings relative to the fixing shaft 311, enabling the rod 31 to swing back and forth by taking the fixing shaft 311 as a fixing point.

Figure 5:
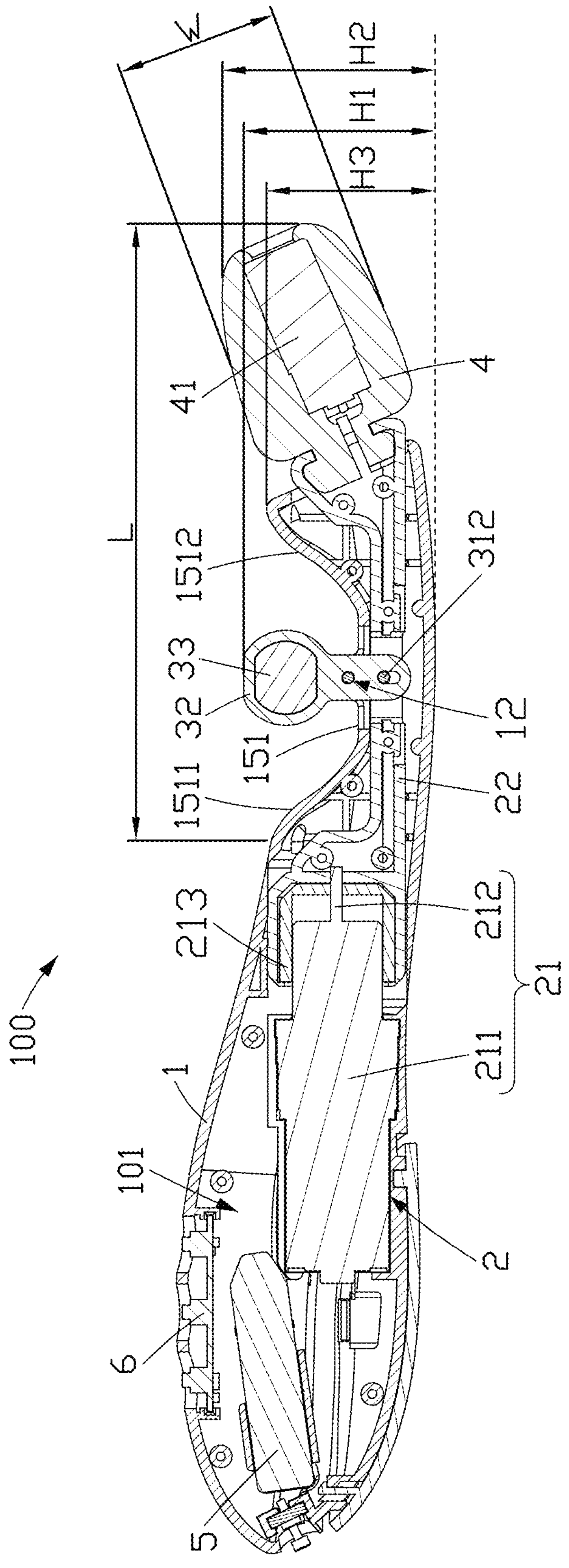
FIG. 5 is a cross-sectional view of a head swinging to a highest position of the massage device shown in FIG. 2.

Refer to FIG. 5 to FIG. 6, the head 33 is sphere-shaped and coupled to the rod 31 (Refer to FIG. 3), Driven by the rod 31, the head 33 swings reciprocally between the first sidewall 1511 and the second sidewall 1512. When the head 33 is close to the first sidewall 1511, the head 33 is in a first state, and when the head 33 is close to the second sidewall 1512, the head is in a second state. When the head 33 is in the first swinging state, the angle formed between its sidewall and the second sidewall 1512 ranges from 15° to 160°, similarly, when the head 33 is in the second swinging state, the angle formed between its sidewall and the first sidewall 1511 ranges from 15° to 160°, at these angles, the vagina is capable of receiving a strong swinging and rubbing massage intensity, achieving a more pleasant stimulation effect.

Referring also to FIG. 5, The insertion portion 15 comprises the main stimulation module 4 and the maximum swing angle α of the rod 31 between the first sidewall 1511 and the second sidewall 1512. The insertion portion 15 is defined as L, and the length of the L ranges between 50-180 mm and can be adjusted according to specific needs.

The exterior of the housing 1 is capable of swinging back and forth reciprocally by taking the fixing shaft 311 as a fixing point, a motor for generating vibrations is accommodated in the head 33, therefore, the head 33 can not only swing back and forth but also vibrate.

When the switch of the massage device 100 is turned on, under the drive of the driving unit 2, the driving member 211 starts to rotate, and drives the connecting base 212 to rotate, the first fixing portion 221 is driven to move forward by the connecting base 212 along the length direction of the housing 1, and the end of the rod 31 away from the head 33 is driven to move forward by the connecting ring 213 via the pivot shaft 312, meanwhile, the rod 31 moves via the fixing shaft 311, while the head 33 swings backward around the fixing shaft 311, the first fixing portion 221 is driven to move backward by the connecting base 212, so that the transmission member 22 moves backward relative to the housing 1, the end of the rod 31, which is farther away from the head 33 is driven to move backward via the pivot shaft 312 by the two connecting arms 223, and the rod 31 moves relative to the housing 1 via the fixing shaft 311, while the head 33 swings forward around the fixing shaft 311.

Drive by the driving unit, the transmission member 22 is driven to perform telescopic movement along the length direction of the housing 1, and the head 33 is driven to swing back and forth by taking the fixing shaft 311 as a fixing point.

Therefore, when the transmission member 22 moves forward, and then drives the rod 31 to move forward as well, the head 33 will swing backward because of the limit of the through hole 11. In other words, the moving direction of the rod 31 is opposite to that of the head 33.

The head 33 is installed in the concave position of the massage device 100, so that the overall height of the sub-stimulation module 3 is lower than that of the main stimulation module 4.

A reference line is defined by a horizontal line passing through a lowest point of the insertion portion 15, a first distance (H1) between the highest point of the arc shaped track of the head 33 and the reference line is less than a second distance (H2) between a highest point of the main stimulation module 4 and the reference line, a third distance between the one end of the second sidewall that nears the main stimulation module and the reference line is less than the first distance and the second distance, main stimulation module main stimulation module allowing the head 33 to overcome the resistance of the inner wall of the vagina and swing back and forth smoothly within the vagina.

A limiting slot 12 is defined in the housing, and the outer diameter of the fixing shaft 311 is slightly lesser than the inner diameter of the limiting slot 12, so that the fixing shaft 311 can rotate in the limiting slot 12.

A vibration 32 is accommodated in the end of the head 33, the head 33 and the vibration 32 are both located exterior to the housing 1, and when combined, their overall outer periphery presents a spherical shape rather than an angular shape.

The main stimulation module 4 is movably installed in the end of the housing 1, and fixedly engages with the second fixing portion 225 of the transmission member 22, when the transmission member 22 is driven to move along the length direction of the housing 1, the main stimulation module 4 moves back and forth along with the transmission member 22. A motor 41 is configured for generating vibrations is accommodated within the main stimulation module 4, wherein the output shaft of the motor 41 is fixedly coupled to the transmission member 22. When the main stimulation module 4 is inserted into the vagina and moved back and forth to stimulate the vagina, the stimulation portion 4 is capable of vibrating by the driven of the motor 41, enabling the first stimulation portion 4 to simultaneously perform both back-and-forth telescoping motion and up-and-down vibration. The width W of the first stimulation portion 4 is 25-45 mm, which is configured for stimulating the vagina at a comfortable sensation.

In order to enhance the overall aesthetics of the massage device 100 and improve the massage effect, wrinkles are arranged on the surface of the housing 1, specifically at the connection position between the main stimulation module 4 and the transmission member 22. Meanwhile, the massage device 100 with the wrinkles is shaped like a penis, which can provide more stimulation for the vagina.

In this embodiment, the housing 1 is covered with a protective cover 7 (refer to FIG. 1), the housing 1, the main stimulation module 2 are both covered by the protective cover 7, while the sub-stimulation module 3 is not covered by the protective cover 7 rather than exposed exterior of it. It is understood that the housing 1, the main stimulation module 2 and the sub-stimulation module 3 are all covered by the protective cover 7. The housing 1 is made of a hard material, such as hard plastic, and the protective cover 7 is made of a soft silicone material which has a smaller hardness than that of the hard material.

When a switch of the massage device 100 is turned on, the transmission member 22 is driven to move by the connecting base 212 along the length of the housing 1, and then the main stimulation module 4 and the head 33 are both driven to do motion together by the transmission member 22, wherein, the main stimulation module 4 and the transmission member 22 maintain the same telescopic movement direction, while the swinging direction of the head 33 is opposite to the telescopic movement direction of the transmission member 22. Simultaneously, the head 33 is driven to vibrate by the vibration 32, the main stimulation module 4 is also driven to vibrate by the motor 41, thereby enhancing the swinging force of the head 33 and the main stimulation module 4.

What is claimed is:

1. A massage device comprising:

a housing comprises:

a handle portion;

an insertion portion configured for inserting into the vagina along an insertion direction, the insertion portion extending and protruding from one end of the handle portion along the insertion direction, the insertion portion comprising a concave concaved inwardly and an internal space of the concave being in air communicating with an exterior environment via an opening;

a sub-stimulation module located and received in the concave, and the sub-stimulation module following the insertion portion to be inserted into the vagina and stimulating an inner wall of the vagina; and a fixing point defined in the insertion portion corresponding to the concave, wherein the sub-stimulation module comprises at least one rod and at least one stimulation head connected to the at least one rod, the concave includes a bottom wall and a side wall coupled to the bottom wall;

the at least one rod is pivoted at the fixing point, and extends from the bottom wall of the concave toward the opening, the at least one stimulation head protrudes out of the opening and has a contacting surface located outside of the concave, the at least one rod swings back and forth along the insertion direction relative to the fixing point, thereby driving the contacting surface of the at least one stimulation head to contact the inner wall of the vagina.

2. The massage device according to claim 1, further comprising a main stimulation module, wherein the main stimulation module is configured for inserting into and stimulating the vagina, and is disposed at an end of the insertion portion away from the handling portion.

3. The massage device according to claim 2, wherein a reference line is defined by a horizontal line passing through a lowest point of the insertion portion, a first distance between a highest point of the arc shaped track of the stimulation head and the reference line is less than a second distance between a highest point of the main stimulation module and the reference line, a third distance between the one end of the concave and the reference line is less than each of the first distance and the second distance, the one end of the concave is located adjacent to the main stimulation module.

4. The massage device according to claim 1, wherein the housing further comprises a first sidewall and a second sidewall each arranged at opposite sides of the concave, respectively, the at least one stimulation head is capable of moving between the first sidewall and the second sidewall, when the at least one stimulation head is close to the first sidewall, the at least one stimulation head is in a first state, when the at least one stimulation head is close to the second sidewall, the at least one stimulation head is in a second state, each of the at least one stimulation head swings between the first sidewall and the second sidewall, and a maximum swing angle is limited by the first sidewall and the second sidewall.

5. The massage device according to claim 1, wherein the sub-stimulation module comprises at least two stimulation heads, and the at least two stimulation heads swing in different directions through the fixing point.

6. The massage device according to claim 1, further comprising a protective cover configured for covering the stimulation head, wherein a material of the stimulation head material has a higher hardness than a material of the protective cover.

7. The massage device according to claim 1, further comprising a fixing shaft as the fixing point, wherein the fixing shaft is accommodated in the housing corresponding to the concave, the fixing shaft passes through the rod, and the fixing shaft is rotatably engaged with an inner wall of the housing.

8. The massage device according to claim 2, further comprising a motor configured for generating vibration, wherein the motor is accommodated in the main stimulation module or in the sub-stimulation module.

9. The massage device according to claim 2, wherein the main stimulation module is curvedly extended from a side of the insertion portion to stimulate the sensitive points of the vagina.

10. A massage device comprising:

an elongate housing extended in a first direction;

a main stimulation module configured for stimulating the first area of the vagina, the main stimulation module being engaged with an end of the elongate housing, and moving along the first direction relative to the elongate housing;

a sub-stimulation module comprising a head and a rod interconnected with each other, the elongate housing comprising a concave formed by a bottom wall and a side wall coupled to the bottom wall, an opening defined in a top of the concave, and the sub-stimulus module located at the concave;

wherein the head extends out of the elongate housing via the opening, and is configured to be inserted into the vagina to stimulate the second area of the vagina, and the rod extends and protrudes from the bottom wall towards the opening and is configured to move along the first direction; and a fixing shaft is accommodated in an upper end of the elongate housing, and coupled to the rod, wherein the head, followed by the rod, swings back and forth around the fixing shaft.

11. The massage device according to claim 10, further comprising a driving unit configured for driving the main stimulation module and the sub-stimulation module to move simultaneously, wherein the driving unit is received in the elongate housing, and coupled to the main stimulation module and the rod.

12. The massage device according to claim 10, wherein the driving unit comprises a driving member and a transmission member engaged with the driving member;

the transmission member is movable received in the elongate housing;

the rod engages with the transmission member, and the head is driven to swing around the fixing point by the transmission member.

13. The massage device according to claim 12, wherein the sub-stimulation module further comprises a pivot shaft arranged on the rod, the pivot shaft and the fixing shaft are arranged side by side along a second direction, the second direction is perpendicular to the first direction, an end of the rod, driven by the transmission member, rotatably moves around the pivot shaft.

14. The massage device according to claim 13, wherein the transmission member comprises a first fixing portion, two connecting arms and a second fixing portion;

a side of the first fixing portion is engaged with the driving member;

the two connecting arms are formed by concaving an end of the first fixing portion downwards and extending outwards, and the end of the first fixing portion is away from the driving member;

two connection holes are formed at the connecting arms respectively and are configured to couple with the pivot shaft, the second fixing portion protrudes upward from the ends of the connecting arms away from the first fixing portion, and the second fixing portion is engaged with the main stimulation module.

15. The massage device according to claim 13, further comprising a groove configured for receiving the end of the rod that is received in the elongate housing, the end of the rod is fixedly connected to an inner wall of the groove through the pivot shaft, so that the rod is further connected to the transmission member and driven to move by the transmission member.

16. The massage device according to claim 15, wherein the concave cooperates with the groove to form a receiving cavity to accommodate the rod and provides a swing space for the rod to swing.

17. The massage device according to claim 2, further comprising a driving unit received in the housing, wherein the driving unit comprises a driving motor and a connecting arm, the connecting arm is configured for connecting the main stimulation module and the driving motor;

the rod includes a fixing shaft and a pivot shaft arranged along a first direction perpendicular to the insertion direction, a fixing hole is defined on the housing corresponding to the fixing point and is configured for being inserted by the fixing shaft, and the fixing shaft is rotatably inserted into the fixing hole so as to move around the fixing hole, the pivot shaft engages with the connecting arm so as to move with the connecting arm, when the driving motor moves, the connecting arm is driven to move, and the main stimulation module and the sub-stimulation module move simultaneously.

18. The massage device according to claim 17, wherein along the first direction, a height of a middle portion of the connecting arm is less than a height of two ends of the connecting arm, and the concave is recessed corresponds to the middle portion of the connecting arm.

19. The massage device according to claim 17, wherein a concave recess is formed by inward depression at the middle portion of the connecting arm corresponding to the concave of the insertion portion and the concave recess is configured to receive an end of the at least one rod, two connecting holes are defined in two side walls of the concave recess, and two ends of the pivot shaft are inserted into the two connecting holes.

* * * * *